US006889345B2

(12) United States Patent
Sicola et al.

(10) Patent No.: US 6,889,345 B2
(45) Date of Patent: May 3, 2005

(54) SYSTEM AND METHOD FOR LOCATING A FAILED STORAGE DEVICE IN A DATA STORAGE SYSTEM

(75) Inventors: Stephen J. Sicola, Palmer Lake, CO (US); Bruce Sardeson, Colorado Springs, CO (US); Dennis Spicher, Monument, CO (US); Bruce Roberts, Colorado Springs, CO (US); Bill Pagano, Colorado Springs, CO (US); Allen B. Kelton, Castle Rock, CO (US)

(73) Assignee: Hewlett-Packard Development Company, LP., Houston, TX (US)

( * ) Notice: Subject to any disclaimer, the term of this patent is extended or adjusted under 35 U.S.C. 154(b) by 592 days.

(21) Appl. No.: 10/004,374

(22) Filed: Oct. 19, 2001

(65) Prior Publication Data

US 2003/0079156 A1 Apr. 24, 2003

(51) Int. Cl.[7] .............................................. G06F 11/00
(52) U.S. Cl. ....................................... 714/43; 370/222
(58) Field of Search ............................. 714/43; 370/222

(56) References Cited

U.S. PATENT DOCUMENTS

| | | | |
|---|---|---|---|
| 5,109,318 A | 4/1992 | Funari et al. | |
| 5,184,281 A | 2/1993 | Samarov et al. | |
| 5,513,314 A | 4/1996 | Kandasamy et al. | |
| 5,663,950 A | * 9/1997 | Lee et al. | 370/224 |
| 5,710,777 A | * 1/1998 | Gawne | 714/717 |
| 5,815,371 A | 9/1998 | Jeffries et al. | |
| 5,815,649 A | 9/1998 | Utter et al. | |
| 5,822,777 A | 10/1998 | Leshem et al. | |
| 5,832,222 A | 11/1998 | Dziadosz et al. | |
| 5,835,700 A | 11/1998 | Carbonneau et al. | |
| 5,987,622 A | 11/1999 | Lo Verso et al. | |
| 5,996,089 A | 11/1999 | Mann et al. | |
| 6,038,689 A | 3/2000 | Schmidt et al. | |
| 6,055,228 A | * 4/2000 | DeKoning et al. | 370/258 |
| 6,073,209 A | 6/2000 | Bergsten | |
| 6,148,414 A | 11/2000 | Brown et al. | |
| 6,188,973 B1 | 2/2001 | Martinez et al. | |
| 6,201,787 B1 | * 3/2001 | Baldwin et al. | 370/222 |
| 6,237,112 B1 | 5/2001 | Yoo et al. | |
| 6,243,790 B1 | 6/2001 | Yorimitsu | |
| 6,260,120 B1 | 7/2001 | Blumenau et al. | |
| 6,266,721 B1 | 7/2001 | Sheikh et al. | |
| 6,278,609 B1 | 8/2001 | Suzuki et al. | |
| 6,282,094 B1 | 8/2001 | Lo et al. | |
| 6,282,096 B1 | 8/2001 | Lo et al. | |
| 6,282,610 B1 | 8/2001 | Bergsten | |
| 2002/0181503 A1 | * 12/2002 | Montgomery, Jr. | 370/468 |
| 2003/0063839 A1 | * 4/2003 | Kaminski et al. | 385/17 |
| 2003/0145254 A1 | * 7/2003 | Ookawa et al. | 714/43 |
| 2003/0191983 A1 | * 10/2003 | Mann et al. | 714/11 |

OTHER PUBLICATIONS

Smart Storage Inc., "SmartStor InfiNet™: Virtual Storage for Today's E–economy," Sep. 2000.

Compaq Computer Corporation, "The Compaq Enterprise Network Storage Architecture: An Overview," May 2000.

Compaq Computer Corporation, "Compaq Storage Works" Data Replication Manager HSG80 ACS V8.5P Operations Guide, Mar. 2000.

* cited by examiner

*Primary Examiner*—Bryce P. Bonzo

(57) ABSTRACT

A system and method for identifying a failed storage device in a storage system comprising a plurality of storage devices connected by a ring-type network is disclosed. In one embodiment, when a storage device fails, all storage devices on the ring-type network are disconnected to re-establish communication on the ring-type network. An iterative process of connecting a subset of storage devices to the ring-type network and testing communication on the ring-type network is performed until communication on the ring-type network is re-established. Then, individual storage devices are connected to the ring-type communication until the connection of a storage device causes communication on the ring-type network to fail, thereby identifying the failed storage device. In another embodiment, devices in a reporting group are tested on a shelf-by-shelf basis.

13 Claims, 10 Drawing Sheets

| SHELF ID | BITS 7..4 | BITS 3..1 | BIT 0 |
|---|---|---|---|
| 1 | 1110 | 110 | 0 |
| 2 | 1110 | 110 | 1 |
| 3 | 1101 | 101 | 0 |
| 4 | 1101 | 101 | 1 |
| 5 | 1011 | 011 | 0 |
| 6 | 1011 | 011 | 1 |
| 7 | 0111 | 110 | 0 |
| 8 | 0111 | 110 | 1 |
| 9 | 1110 | 101 | 0 |
| 10 | 1110 | 101 | 1 |
| 11 | 1101 | 011 | 0 |
| 12 | 1101 | 011 | 1 |
| 13 | 1011 | 110 | 0 |
| 14 | 1011 | 110 | 1 |
| 15 | 0111 | 101 | 0 |
| 16 | 0111 | 101 | 1 |
| 17 | 1110 | 011 | 0 |
| 18 | 1110 | 011 | 1 |
| 19 | 1101 | 110 | 0 |
| 20 | 1101 | 110 | 1 |
| 21 | 1011 | 101 | 0 |
| 22 | 1011 | 101 | 1 |
| 23 | 0111 | 011 | 0 |
| 24 | 0111 | 011 | 1 |
| CABINET CABLE DISCONNECTED | 1111 | XXX | X |
| CABINET CABLE DISCONNECTED | XXXX | 111 | X |

FIG.4

SYSTEM AND METHOD FOR LOCATING A FAILED STORAGE DEVICE IN A DATA STORAGE SYSTEM

BACKGROUND OF THE INVENTION

1. Field of the Invention

The present invention relates to computer-based information storage systems. More particularly, the present invention relates to systems and methods for locating a device having a failed communication port in a multi-disk storage assembly, e.g., a RAID (Redundant Array of Independent Disks) array storage assembly.

2. Relevant Background

In the computer industry, there is ongoing and increasing demand for data storage systems with more capacity as well as improved reliability. The use of RAID (Redundant Arrays of Inexpensive Disks) systems has significantly enhanced data storage reliability by providing redundancy, i.e., failure of one system component does not cause loss of data or failure of the entire system. Although initially RAID systems generally provided redundant disk drives, more functional redundancy has recently been provided by extending redundancy to device enclosures. These enclosures may include a number of components such as power supplies, cooling modules, disk devices, temperature sensors, audible and/or visible alarms, and RAID and other controllers. To provide functional redundancy, the enclosure typically includes an extra one of each of these components that is needed for proper functionality. For example, two power supply units may be provided such that if one fails the remaining power supply unit is capable of providing adequate power.

Providing monitoring and control over the devices and enclosures within each cabinet in the storage system complex has proven to be a difficult problem for the data storage industry. Mass storage systems typically include numerous multi-shelf cabinets or racks each holding multiple enclosures. The systems are adapted for replacement of individual enclosures to upgrade or modify the system or in some cases, to service an enclosure but a system of collecting status information and controlling operation of each device is required to manage the systems. Often, control devices such as array controllers are used to control the transfer of environmental data from the devices and to issue control commands to the devices, and a management tool such as a host computer with or without a graphical user interface (GUI) is provided to allow a system operator to manage device operations through the array controllers.

This arrangement has increased mass storage system complexity and cost by requiring a separate management tool or device for every array controller. Providing uniform control over the system devices is difficult with this common arrangement because accessing all the devices required operating all of the management devices and/or communicating with all of the array controllers even when the array controllers are physically located within the same cabinet. Additionally, it is difficult to allow sharing of resources between cabinets because each cabinet is typically serviced by different array controllers and/or management devices. Hence, there remains a need for an improved method and system for accessing information from and controlling operation of devices, such as enclosures and components within the enclosures, within a multi-cabinet mass storage system or complex.

In many mass storage systems, the data storage devices are connected to a host computer by a high-speed data communication link, e.g., a Fibre Channel Arbitrated Loop (FCAL), to provide a network of interconnected storage devices. Some storage network architectures use a communication protocol similar to a token ring, such that the failure of one storage device on the communication link may cause the entire communication link to fail. This can result in the catastrophic failure of large portions of storage networks.

The failed storage device must be repaired, replaced, or removed from the communication link to re-establish communication between the storage devices and the host computer. It will be apparent that the location of the failed device must be determined before the device can be repaired, replaced, or removed from the communication link. However, locating the failed device can be a time-consuming and expensive task. Large-scale storage systems may include thousands of storage devices, and each communication link in the storage system may have over one hundred devices connected to the link. Absent automated methods for locating failed devices, system administrators must test independently each device on the link to determine which device caused a failure. Manual testing processes can consume hours of administrative time, during which time the data on the communication link may not be accessible to end users of the storage system. Accordingly, there remains a need in the art for improved storage systems and for methods for locating failed storage devices in mass storage systems.

SUMMARY OF THE INVENTION

The present invention addresses these and other needs by providing systems and methods for locating a failed storage device in a storage system comprising a plurality of storage devices connected by a ring-type network. The invention may be implemented in a storage system that includes a plurality of storage devices communicatively connected by a ring-type network, e.g., a FCAL. The ring-type network includes at least one, and preferably two, controllers. The storage devices may reside in enclosures, which are disposed on shelves of one or more storage cabinets. Each enclosure has at least one I/O module for regulating access to the ring-type network. To provide a redundant communication path, the FCAL may be a dual-loop FCAL, and the enclosures may include two I/O modules for regulating access to the "A" loop and the "B" loop of the ring-type network. Preferably, the storage cabinet(s) include a cabinet bus that provides an out-of-band (i.e., separate from the ring-type network) communication connection between the controllers and the input/output modules. When communication on the ring-type network fails, the controller communicates as necessary with the input/output modules on the communication path provided by the cabinet bus.

In another aspect, a storage system in accordance with the present invention may include a management system that permits arrays of disk drives or enclosure devices to span multiple cabinets, minimizes the single points of failure, and enables a single device or controller to obtain environmental data by addressing any drive on a communication link while satisfying the SCSI Enclosure Services (SES) specifications (such as the sub-enclosure reporting specifications).

More particularly, the management system organizes the storage devices into a plurality of reporting groups, each having an enclosure processor, such as an environmental monitoring unit (EMU) for generating and transmitting environmental messages pertaining to the particular enclosure. The system further includes a communication bus linked to each of the enclosures for broadcasting or transmitting environmental messages. In one embodiment, the enclosures are positioned on shelves within one or more cabinets and the bus is a cabinet cable contained within each cabinet. Typically, the environmental messages include information identifying which reporting group the sender belongs to and the physical location of the sending device within the system (e.g., cabinet identification and shelf position within the identified cabinet).

The system may be arranged with additional enclosures included in each reporting group and the enclosures of each reporting group may be located in one or more cabinets. Each cabinet may house one, two, or more reporting groups. Preferably, each cabinet in the system is linked by a cabinet communication network that allows substantially concurrent broadcast of environmental messages throughout the storage system so that enclosures in a single reporting group may be positioned in different cabinets. Each cabinet may include a cabinet processor or EMU in the communication path between the cabinet bus and cabinet communication network to broadcast messages originating within the cabinet over the network and to receive the messages on the network. The cabinet processor may act as a firewall, e.g., by only transmitting messages pertaining to reporting groups housed in its cabinet to the cabinet bus.

Each of the enclosures in a single reporting group may be linked with a separate data loop, such as a FCAL. A host device or management tool is linked to the data loop to monitor operation of the enclosures within the reporting group and to issue command sets to the enclosures within the reporting group. In each reporting group, one enclosure is designated as the primary reporting device and is responsible for receiving command sets for the reporting group (and redistributing the command sets as appropriate) and for reporting environmental information collected for the entire reporting group from the cabinet bus. To allow any enclosure to be the primary reporting device, each of the enclosure processors are adapted to identify which messages on the cabinet bus pertain to their reporting group and to collect and store at least portions of this information in the enclosure memory. With this arrangement, the enclosure devices can be reassigned to different reporting groups and the primary reporting device can be changed as needed to efficiently use the resources of the system.

According to one aspect of the invention, in response to a communication failure on the ring-type network, all devices on the ring-type network are disconnected to re-establish communication on the ring-type network. An iterative process of connecting a subset of storage devices to the ring-type network and testing communication on the ring-type network is performed until communication on the ring-type network is re-established. In one embodiment, devices on the ring-type network are divided into two subsets: a first subset consisting of devices disposed in odd-numbered slots and a second subset consisting of devices disposed in even-numbered slots. After communication on the ring-type network is re-established, individual storage devices may be connected to the ring-type communication network until the connection of a storage device causes communication on the ring-type network to fail, thereby locating the failed storage device.

In one embodiment, the present invention provides a method of locating a failed device in a storage system having a plurality of storage devices connected by a ring-type network. According to the method, network access for all devices on the communication network is disabled. Then, the following steps are performed iteratively until communication on the ring-type network is restored: (1) enabling network access for a subset of devices on the communication network, (2) testing communication on the communication network, and (3) if communication on the communication network fails, then disabling network access for the subset of devices. After communication on the communication network is restored, network access for individual devices on the communication network is enabled until the addition of a storage device causes the ring-type network to fail.

In another embodiment, the present invention provides a system for locating a failed device in a computer-based information storage system. The system includes at least one controller connected to a ring-type communication network and connected to at least one input/output module for regulating access to the communication network by the devices. The system also includes a processor that executes logic for generating a signal for disabling network access for all devices on the communication network and transmits the signal to at least one input/output module on a communication bus separate from the communication network. The system further includes a processor executing logic for iteratively performing the following steps until communication on the communication network is restored: (1) generating a signal for enabling network access for a subset of devices on the communication network, (2) transmitting the signal to the input/output module, (3) testing communication on the communication network; and (4) if communication on the communication network fails, then disabling network access for the subset of devices. Finally, the system includes a processor executing logic for enabling network access for individual devices onto the communication network until the addition of a device causes the communication network to fail. In one embodiment, the processor(s) reside in a controller. In an alternate embodiment, the processor(s) reside in a host computer. Preferably, the devices are arranged in enclosures disposed on shelves of a networking storage cabinet, and a cabinet bus provides a communication link to the devices separate from the communication network for transmission of the signals from the processor.

In yet another embodiment, the invention provides a computer program product in a computer readable medium for locating a failed device in a computer-based information storage system. The computer program product comprises first instructions for disabling network access for all devices on the ring-type communication network. The computer program product further comprises second instructions for iteratively performing the following steps until communication on the communication network is restored: (1) enabling network access for a subset of devices on the communication network, (2) testing communication on the communication network, and (3) if communication on the ring-type network fails, then disabling network access for the subset of devices. Finally, the computer program product comprises third instructions for enabling network access for individual storage devices onto the communication network until the addition of a storage device causes the ring-type network to fail.

BRIEF DESCRIPTION OF THE DRAWINGS

FIG. 4 is a table illustrating shelf identifiers obtained using an eight-wire arrangement in a cabinet cable;

DETAILED DESCRIPTION OF THE PREFERRED EMBODIMENTS

Figure 1:
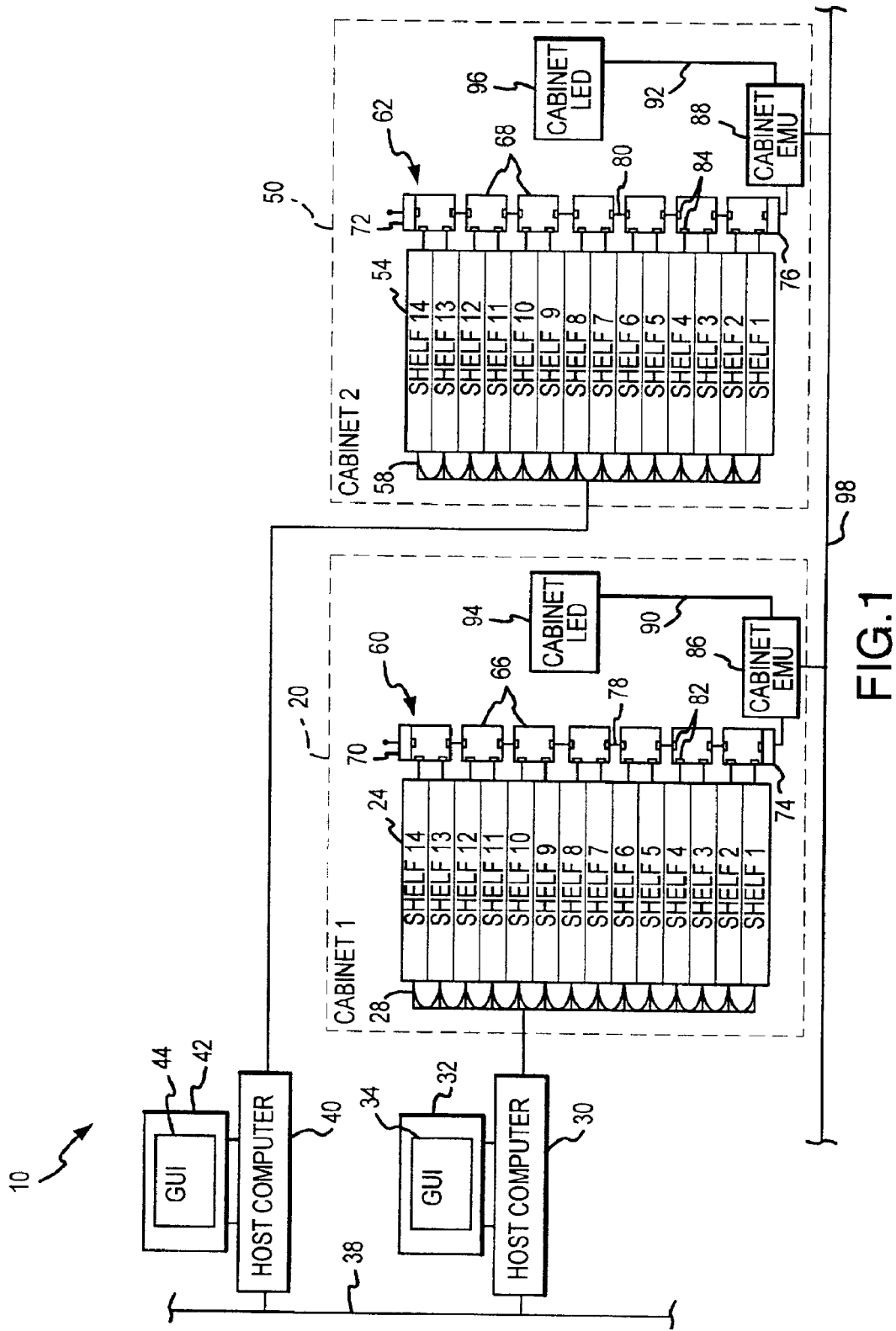
FIG. 1 is an illustration of a data storage system or complex with cabinets having multiple shelves incorporating a cabinet cable that provides position detection useful with the unified management system of the present invention.

FIG. 1 illustrates a data storage system 10 that provides components that function in combination to provide one technique of providing enclosure position sensing. As shown, the data storage system 10 has a first and second cabinet 20, 50 (although typical systems 10 may have many more cabinets 20, 50) each having a plurality of shelves 24, 54. The shelves 24, 54 or shelf locations are configured to allow an enclosure (such as the device enclosure 100 of FIG. 2) or other components to be plugged into and supported within the cabinet 20, 50. Typical cabinet 20, 50 configurations call for fourteen shelves 24, 54 although more shelves may be provided, such as up to twenty-four or more shelves 24, 54. If shelves 24, 54 are arranged vertically, a typical cabinet 20, 50 may have twenty-four shelves 24, 54, each of which occupy a certain amount of rack space, such as 3 retma (U) (a standard mounting unit increment).

Each shelf 24, 54 (and more particularly, the enclosure 100 at a shelf location 24, 54) is linked to a Fibre Channel loop 28, 58 or other data link that enables access by and data flow to a host computer 30, 40. The data that is passed may include SCSI-3 Enclosure Services (SES) data, command sets, and position information that identifies the shelf position and cabinet number or other identifier. The host computer 30, 40 may be a personal computer (PC), a server, or other computer or electronic device having a processor that executes logic instructions for allowing a user to access the position information (i.e., to receive the position information or signals from the Fibre Channel loops 28 and display or otherwise provide enclosure position information to the user). In one embodiment, host computer 30, 40 includes a monitor 32, 42 and provides enclosure position information via a graphical user interface (GUI) 34, 44. The host computers 30, 40 may be linked to a communication network or bus, such as a company Ethernet, intranet, or the like, to allow information from enclosures on the shelves 24, 54 to be requested, retrieved, and transmitted to users at a location remote from the cabinets 20, 50.

Significantly, cabinets 20, 50 include cabinet cables or busses 60, 62 that are configured to passively provide electrical signals to enclosures on the shelves 24, 54 that uniquely identify the position (e.g., the vertical position) within the cabinet 20, 50. The cabinet cables 60, 62 also provide an out-of-band (external to any fibre channel loop) communication path between the shelves 24, 54 (as will be discussed further in relation to FIGS. 5 and 6). The cabinet cables 60, 62 include a number of junction boxes 66, 68. As shown, each junction box 66, 68 is linked to two shelves 24, 54. Each junction box 66, 68 includes four connectors, such as RJ-45 connectors, for connection to the shelves 24, 54 and adjacent junction boxes 66, 68 and/or terminators. The cable 60, 72 further includes a top terminator 70, 72, and a bottom terminator 74. The cabinet cable 60, 62 components are explained in more detail with reference to FIG. 3 that illustrates an exemplary wiring arrangement for a portion of the cable 60.

Each cabinet 20, 50 includes a cabinet EMU 86, 88 that provides cabinet information such as a cabinet identifier, cabinet type, and the like that is passed via the cabinet cable 60, 62 to the shelves 24, 54 for use by an enclosure in sensing or determining position of the enclosure within the system 10. The cabinet information may originate at the cabinet EMU 86, 88 located within the cabinet 20, 50. In multi-cabinet systems 10, the cabinet EMU 86, 88 typically also acts as a firewall and router for SES information. In this regard, the cabinet EMU 86, 88 may be linked to a communication link or network 98 (such as a private Ethernet) that allows the EMU 86, 88 to broadcast SES data for all shelves or groups of shelves 24, 54 to other cabinet EMUs 86, 88. The cabinet EMU 86, 88 filters the received SES data and forwarded to the corresponding enclosures on shelves 24, 54 by group (e.g., the received SES data is rebroadcast via the cabinet bus 60, 62). The cabinet EMU 86, 88 also transmits signals to the cabinet LED display (and audio alarm) 94, 96 for displaying status information for enclosures on the shelves 24, 54.

Figure 2:
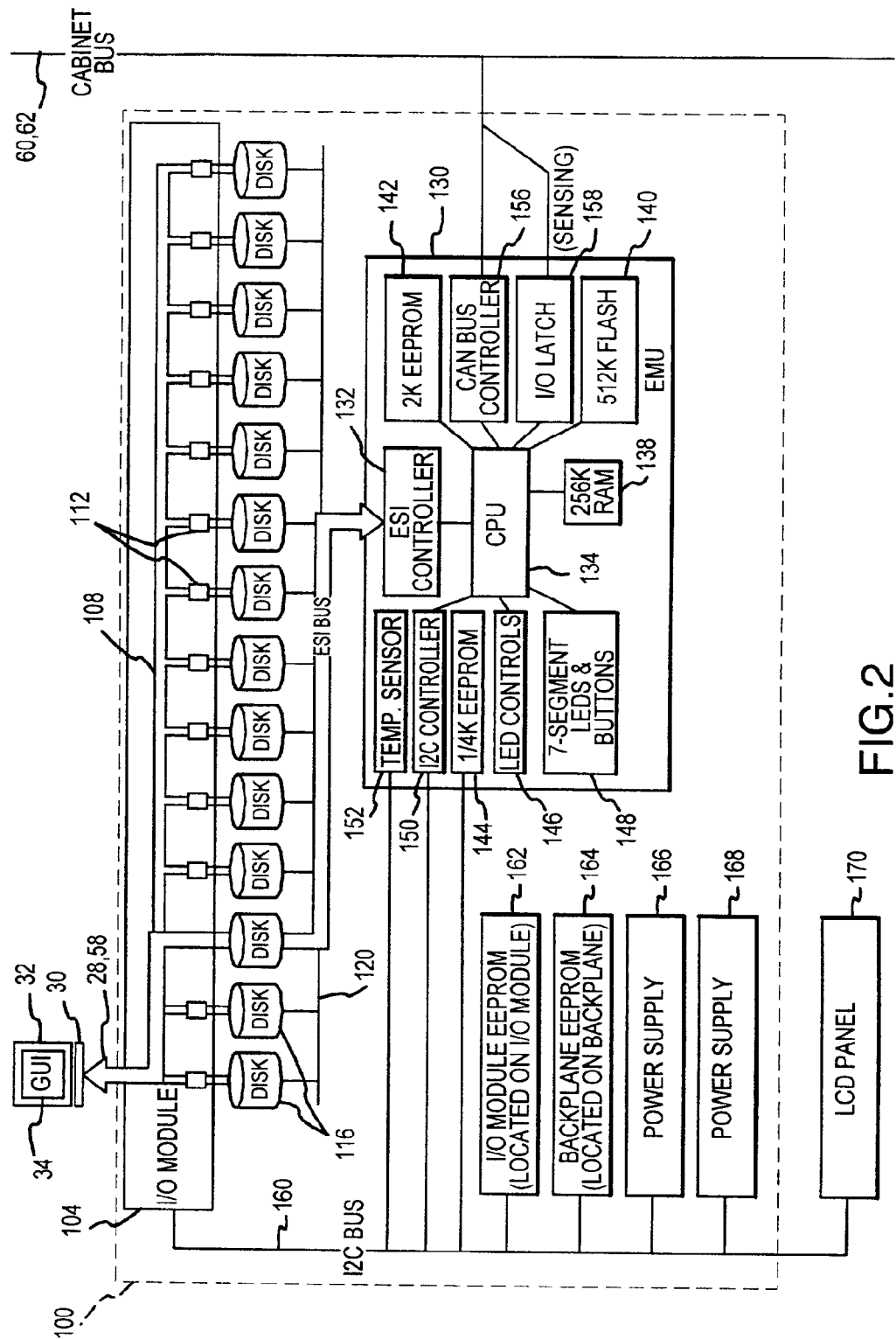
FIG. 2 is a simplified block diagram of an exemplary device enclosure that may be positioned on a shelf of the cabinets of FIG. 1.

FIG. 2 illustrates an exemplary device enclosure 100 that according to the invention is configured to receive passive position signals from the cabinet cable 60, 62, process the signals including the cabinet identifier from the cabinet EMU 86, 88 (or another component), and transmit the enclosure position information in a signal to the host computer 30 (or 40). Note, the term shelf is often used for components within a cabinet 20, 50 such as an enclosure 100. As used herein, the terms shelf and shelf position identify a location, e.g., a vertical position, within a cabinet 20, 50 at which an enclosure 100 or other component(s) may be connected or plugged in to the system 10.

The GUI host 30, 40 refers generally to any controller or host adapter capable of processing enclosure position signals and displaying (or otherwise reporting) the enclosure position to a user. The host typically will also be used to communicate SES data or pages via the Fibre Channel loop 28, 58 to and from the cabinets 20, 50. The highlighted path from the GUI host 30, 40 is used to show one exemplary path in the enclosure 100 for such SES data. The enclosure 100 also includes a communication link to the cabinet cable 60, 62 to receive the cabinet identifier and shelf position information or identifier from the cable 60, 62 (as explained below).

The enclosure 100 includes an input/output (I/O) module 104 linked to a Fibre Channel loop 28, 58. The Fibre Channel loop 28, 58 is typically an arbitrated loop and although this diagram only shows one loop 28, 58 passing to (as shown by dashed lines 108) the I/O module 104, the enclosure 100 may have two redundant loops with two I/O modules 104. The I/O module 104 acts as a communication interface to a plurality of disk devices or disk drives 116. Each I/O module 104 includes a bypass circuit 112 for each disk drive 116. The bypass circuit 112 can redirect the fibre loop 108 to include or exclude the disk drive 116 in the loop 108. If an EMU 130 is included in the enclosure 100, the EMU 130 can be used to control the bypass circuits 112 via the I²C bus and the I/O module 104. If no EMU 130 is present, the I/O modules can be configured to control the bypass circuits 112.

A number of standard disk devices may be utilized for the disk drives 116 to practice the invention. For example, in one embodiment, the disk drives 116 are selected to conform to the "Enclosure Initiated ESI" option described in the "SFF Committee, SFF-8067 Specification for 40-pin SCA-2 Connector w/Bi-directional ESI," Rev. 2.6, Nov. 19, 1999. An Enclosure Services Interface (ESI) bus 120 is provided to facilitate position and SES data to be passed between the EMU 130 and the GUI host 30, 40. Preferably, the ESI bus 120 permits EMU 130 to provide enclosure position and SES data signals without occupying an address on the fibre channel loop 108 (although in some embodiments the EMU 130 may be directly linked to the host 30, 40).

As shown, enclosure 100 includes an EMU 130 that processes and broadcasts SES data to the GUI host 30, 40 and/or the cabinet EMU 86, 88 (as will be discussed more with reference to FIGS. 5–7). EMU 130 also processes and forwards passive shelf identifier information and cabinet identifier information from the cabinet cable 60, 62. To this end, EMU 130 includes an ESI controller 132, an EMU processor or CPU 134, and a controller area network (CAN) bus controller 156. Memory is provided for use by the CPU 134, and may take many forms such as that illustrated of RAM 138 (such as 256 K), flash memory 140 (such as 512 K), and EEPROM 142 (such as 2 K). Cabinet cable or bus 60, 62 are connected to the CAN bus controller 156 to allow the EMU 130 to obtain the shelf identifier signal. In other embodiments (not shown) EMU 130 may obtain the shelf identifier or number from other wires on the cabinet bus 60, 62 connected to other components of the EMU 130 or of the enclosure 100.

The EMU 130 further includes memory 144 in the form of ¼ K EEPROM that is typical of many printed circuit assemblies and may be used by the EMU 130 for storage of type and revision information, worldwide names, serial numbers, and similar information. LED controls 146 and an input and output display 148 are provided for operation by the EMU CPU 134. An I²C (Inter-Integrated Circuit) controller and temperature sensor 152 are provided and linked to the I²C bus 160 which provides a communication path for the EMU 130 to receive status information from and to send control information to all of the elements of the enclosure 100. The enclosure 100 further includes I/O module 104 memory 162 and backplane memory 164 linked to the I²Cbus 160. Redundant power supplies 166,168 are also provided and linked to the I²Cbus 160. A LCD panel 170 for the enclosure 100 may also be provided and linked (by a RJ-45 connector or otherwise) to the I²C bus 160 for receiving control signals from the EMU 130.

The enclosure 100 passively receives electrical signals that it uses to determine a unique digital identifier for the shelf 24, 54 upon which the enclosure is positioned. This is achieved with the use of the cabinet cable 60, 62 that provides a series of junction boxes 66 that each provide a unique shelf identifier for a set of shelves 24, 54 (such as for 2 shelves). The cabinet cable 60, 62 further includes wires that are divided into sensing sets or groups that work in combination to provide a single position signal that identifies the shelf 24, 54 (e.g., vertical position within the cabinet 20, 50). Two sensing sets are used along with alternate grounding and wire crossover between junction boxes 66 to provide passive signaling of shelf identifiers. Depending on the number of shelves 24, 54 to be identified in a cabinet 20, 50, numerous combinations of numbers of wires in each sensing set may be used such as sets of 5 and 2, 4 and 3, and the like.

Figure 3:
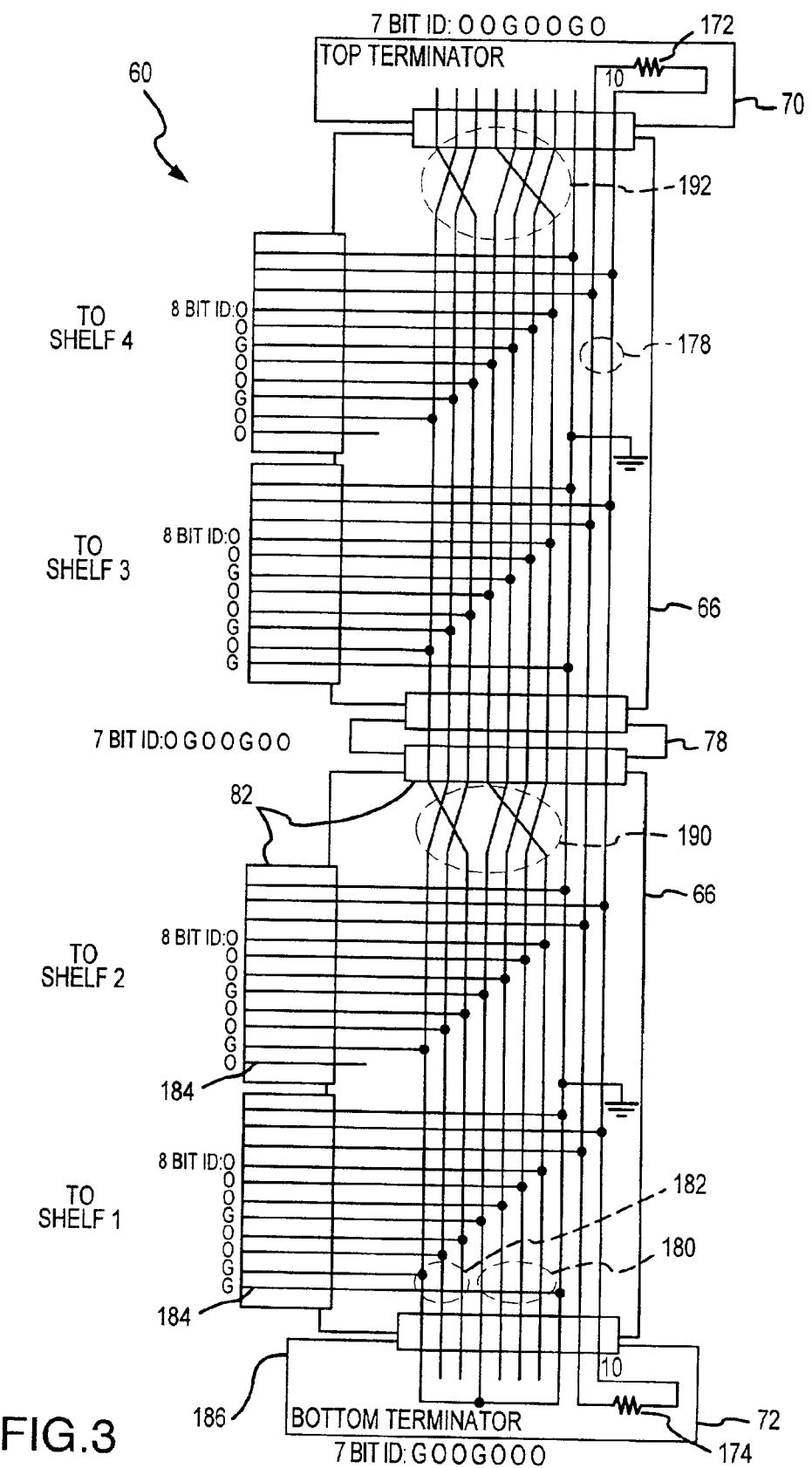
FIG. 3 is a wiring diagram of a portion of a cabinet cable illustrating a 3-4 wiring arrangement used in one embodiment to provide position detection by supplying unique digital identifiers to each shelf location in a cabinet.

FIG. 3 shows one preferred embodiment of a cabinet bus 60 that provides 24 unique shelf identifiers (as shown in tabular form in FIG. 4). A small portion of the cabinet bus 60 is provided illustrating only two junction boxes 66 although the number of junction boxes 66 typically will range between 7 and 12 for most cabinets 20, 50 to identify between 14 and 24 shelves 24, 54. The cabinet bus 60 has two main purposes: provide an identifier for an enclosure 100 location within the cabinet 20, 50 (such as vertical position in distances in units of 3U from the bottom of the cabinet 20, 50 and cabinet designation or identifier) and provide a communications path between the device enclosure EMUs 130 in the cabinet 20, 50 that does not conflict or compete with the data path 108 to drives 116 within the enclosures 100. The combination of the shelf location and cabinet designation provides complete enclosure position information that allows complete mapping or visualization of every enclosure 100 on shelves 24, 54 in the data storage system 10.

In the embodiment illustrated in FIG. 3, a ten-wire arrangement for the cabinet bus 60 is shown with seven wires being dedicated to passively providing the shelf location to the side connectors 82 in which enclosure 100 is connected (such as to EMU 130 via CAN bus controller 156). As shown, two wires are used for a CAN bus 178 and the remaining wire is used as a ground for the cabinet bus 60. The "horizontal" portion of the cabinet bus 60 is a stub that taps off the "vertical" portion at a specific location for a single shelf 24, 54.

The cabinet bus 60 is fabricated of modular pieces called junction boxes 66. Each junction box has four connectors 82, 84, such as RJ-45 connectors. Two connectors 82 (side or transverse connectors) are stubs that connect to two shelves 24, 54 (as shown with connectors 82, 84 to shelf 1 and shelf 2 for one junction box 66 and to shelf 3 and 4 for the second junction box 66). The other two connectors 82, 84 (end or inline connectors) function to enable the junction boxes 66 to be daisy chained to adjacent junction boxes 66 with an inter-junction cable 78, 80. In a typical cabinet 20, 50, each junction box 66 serves 2 shelves (or 6U of height in a 3U spacing arrangement) within the cabinet 20, 50. To facilitate operation of the CAN bus 178, terminating resistors 172, 174 (such as 120 ohm resistors) are provided at each end of the active bus 178. In one embodiment, the terminating resistors 172, 174 are contained in terminating plugs 70, 72 attached to the top and bottom junction boxes 66 in the cabinet bus 60.

The cabinet bus 60 includes a first and second sensing group of wires 180, 182 and a selectively grounded wire 184 that are dedicated to providing shelf identifier or position information to the side connectors 82 (and, connected enclosures 100). As shown, the first and second groups 180, 182 include a total of seven wires with the first group 180 including 4 wires and the second group 182 including 3 wires. At the bottom terminator 174 (in the bottom of the cabinet 20, 50), one wire from each group 180, 182 is grounded and the remaining wires in each group 180, 182 are left open or ungrounded. The signals from each wire in the groups 180, 182 are pulled up (and then combined and processed) in each EMU 130 in the shelves 24, 54 via the side connectors 82. The illustrated embodiment of cabinet bus 60 shows the starting bits (i.e., 7-bit initial ID) of an identifier signal being "OOGOOOG" (for open (O) or a 1 bit and ground (G) or a 0 bit) when the two sensing groups 180, 182 signals are combined sequentially (group 182 followed by group 180).

An eighth sense wire 184 is provided and added to the horizontal stub for each shelf 24, 54 in each junction box 66 (as shown, twice for each box 66). The additional sense wire 184 provides a binary value (or final bit) that is alternately grounded within each junction box 66 to provide a unique shelf identifier (ID) for each shelf 24, 54 within a box 66. As shown, the sense wire 184 is grounded on the first portion of the junction box 66 at 186 prior to tying to the side connector 82 but left open in the second portion of the junction box 66 prior to tying to the second side connector 82. In this example, the first shelf position identifier is the 8-bit ID of "OOOGOOGG" when the first and second sensing groups 180 and 182 are combined with the additional sense wire 184. The second shelf position identifier is differentiated by leaving the sensing wire 184 ungrounded and becomes the 8-bit ID of "OOOGOOGO." In this manner, the passive position sensing method of the present invention is able to uniquely identify each shelf 24, 54 in each junction box 66 although the same signal originates (from the starting 7-bit identifier) in the combination of the two sensing groups 180, 182.

To provide a unique identifier (e.g., 7-bit identifier) to each junction box 66, the passive numbering scheme utilizes numbers of wires for groups 180, 182 that are relatively prime, such as 3 and 4 in the illustrated embodiment. Significantly, the lines within each group 180, 182 are rotated or crossed-over as shown at 190 and 192 after the final side connector and at least before the next connection to the next junction box 66. In other words, each wire in each sensing group 180, 182 is moved one position within the group 180, 182 to present a new position code to the next junction box 66 along the cabinet bus 60 (including a last position to a first position). For example, as shown, the rotation or "next position" moving of the wires in the groups at 190 causes the initial position identifier signal to change from "GOOGOOO" to "OGOOGOO" and at 192 to change from "OGOOGOO" to "OOGOOGO."

In operation, the shelf ID is determined from the combined signals of the eight lines (TTL or other lines) of the first and second sensing groups 180, 182 and the additional sensing line 184 from the cabinet bus 60. The use of groupings of 3 and 4 lines (sets 182, 180) combined with an alternately grounded eighth line 184 provides 24 unique identifiers as shown in the table of FIG. 4. FIG. 4 further shows how for each segment of cable 60 corresponding to a junction box 66 the single binary bit of the alternating grounded wire 184 provides two unique shelf IDs. The larger cabinets 20, 50 generally have heights of less than about 42U, and each storage shelf 24, 54 occupies 3U with a pair of controller shelves/enclosures occupying another 3U of the cabinet height. Hence, typical cabinets 20, 50 contain 14 or less shelves 24, 54 and the 24 shelf IDs provided by the illustrated example is more than adequate.

A shelf ID of "0" is reserved to indicate the actual shelf position cannot be determined. Shelf IDs of 1 to 14 shown in FIG. 4 are used for shelves 24, 54 used for device enclosures 100 and indicate the height the shelf 24, 54 is from the bottom of the cabinet 20, 50. Shelf ID of "15" is reserved for a cabinet EMU with the other shelf IDs being reserved for expansion. As shown in the table of FIG. 4, the position signal provided by the cable 60 can also indicate a cabinet cable 60 is disconnected which occurs whenever every wire in either of the sensing groups 180, 182 is left open or ungrounded.

The enclosure 130 with the CPU 134 can process the received shelf ID signal from the side connector 82 to quickly look up or otherwise determine the shelf ID (which is typically a number of distance unit, such as 3Us, from the bottom of the cabinet 20, 50) and convert this to a four bit shelf ID (i.e., representing shelf IDs of 1 to 14). The cabinet identifier information, such as a cabinet number, from the cabinet EMU 86, 88, is unique number and in some embodiments is a unique 8-bit number. In operation, the EMU 130 operates to transmit the shelf ID and cabinet number in each message, such as in the message header, to allow the receiving device (e.g., the monitoring GUI host 30, 40 or another enclosure 100 in another cabinet 20, 50) to quickly identify and/or map the physical location of the enclosure 100 within the data storage system 10 by shelf 24, 54 and cabinet 20, 50. Of course, if no message is received from an EMU 130, the enclosure 100 is not present or in other words, if a shelf ID and cabinet number combination is not reported to the GUI host 30, 40 then that location would be considered open or available.

Figure 5:
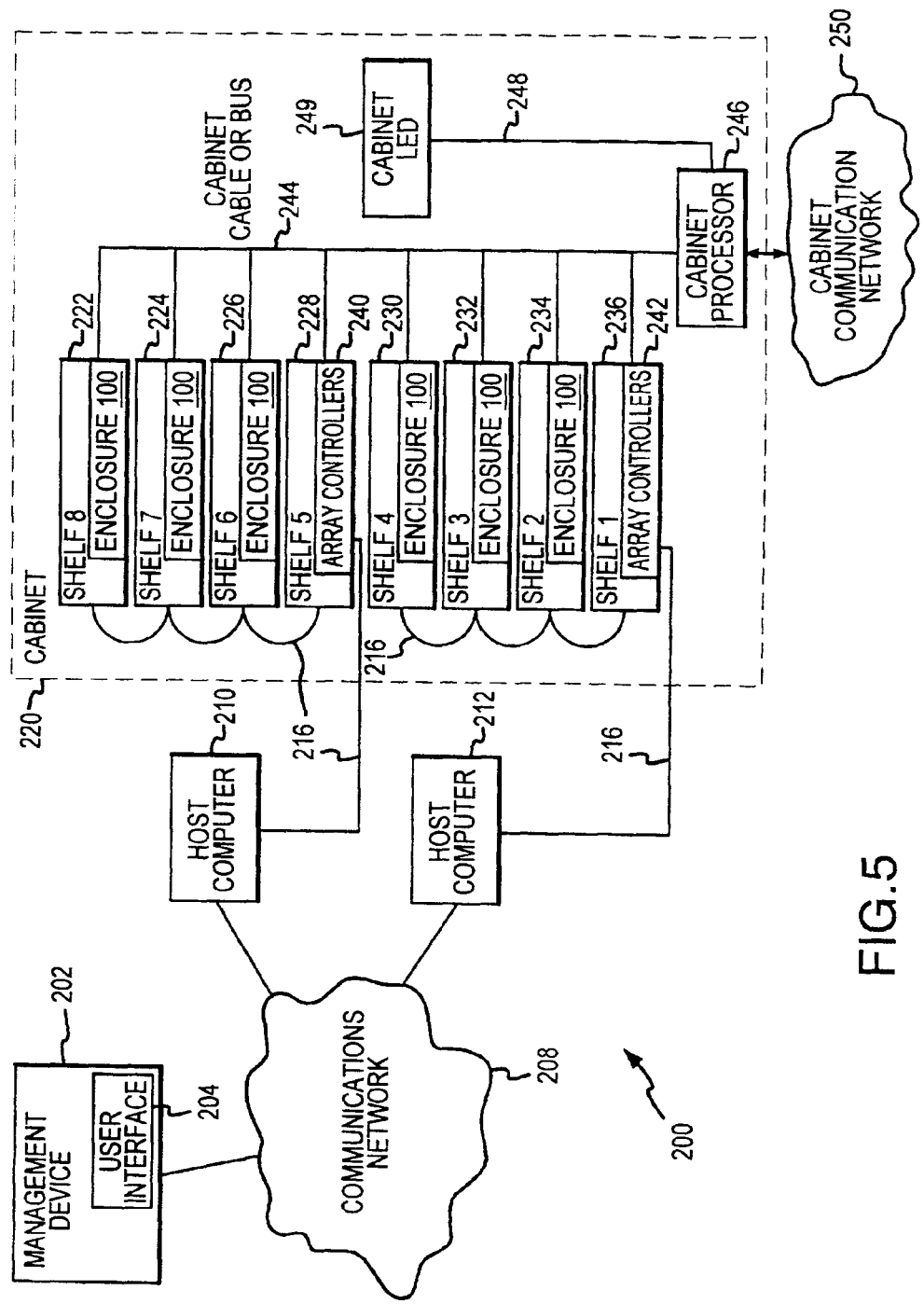
FIG. 5 is another exemplary portion of a mass storage complex illustrating one arrangement of a cabinet with two reporting groups including array controllers and hosts.
Figure 6:
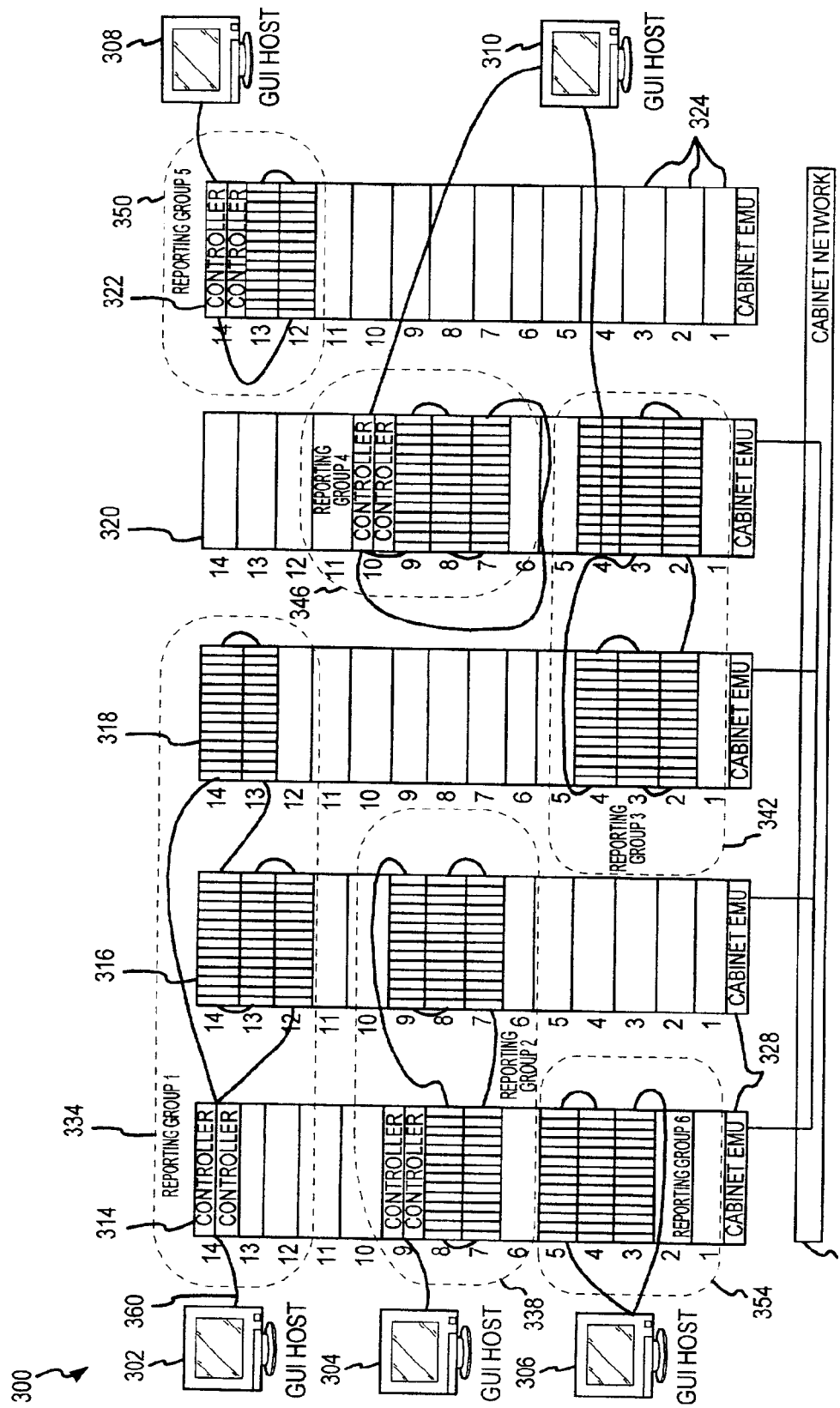
FIG. 6 is mass storage system arranged for unified management (i.e., by any GUI host or single device) illustrating that the present invention supports reporting groups within a single cabinet or spanning two or more cabinets and illustrating the use of cabinet processors or EMUs linked via a cabinet communications network to simultaneously broadcast device and enclosure information throughout the system and among cabinets.
Figure 7:
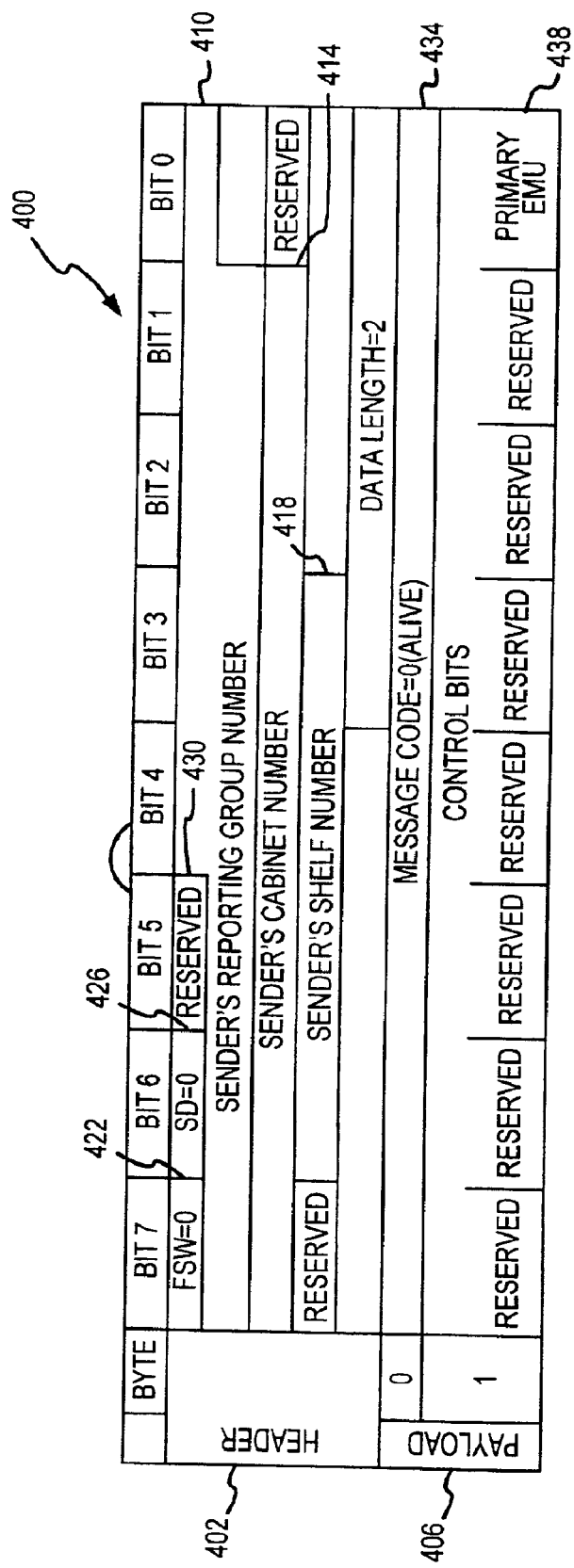
FIG. 7 illustrates one embodiment of a message header for use with the messages broadcast by the enclosure processors or EMUs and/or the cabinet processors or EMUs.

With an understanding of position sensing and of cabinet and enclosure structure, a unified management system and method according to the present invention is provided with reference to FIGS. 5–7. FIG. 5 illustrates a simplified mass storage complex 200 incorporating the unified management features of the invention. The system 200 provides for a single device in the management device 202 that can access and control each of the devices in the system 200. The management device 202, which may be a personal computer, a server, a laptop or handheld or any useful computing or electronic device, includes a user interface 204 (such as a monitor, mouse, keyboard, and GUI) to receive and display information to and from an operator at a single location. The management device 202 is linked to a communications network 208 which may include an Ethernet, an Intranet, the Internet, a LAN, a WAN, or other useful digital data communication network or link. As will become clear, the system 200 includes two reporting groups and as such, includes two host computers 210, 212 linked to and operable by command sets or signals by the management device 202 via the communications network 208. Again, the host computers 210 may be any of a number of useful computing devices, such as a PC, and preferably include a user interface, such as a GUI, for facilitating user operation and display of system information.

The host computers or GUI hosts 210, 212 are in turn communicatively linked to the cabinet or rack 220 and the components positioned therein by data link 216, which in one embodiment includes one or more fibre channel loops. The cabinet 220 shown is a simple configuration useful for explaining several of the important features of the invention. The cabinet 220 includes eight shelves 222, 224, 226, 228, 230, 232, 234, 236 adapted for physically supporting and communicatively linking computing and other devices. As illustrated, six of the shelves 222, 224, 226, 230, 234, 234 hold enclosures 100 (as shown in FIG. 2 or of other configurations) while two shelves 228, 236 hold controllers 240, 242 (such as array controller pairs provided for redundancy in typical RAID cabinets).

An aspect of the invention is the organizing of system 200 components and communication links into groups called reporting groups. This grouping of the components and communication links facilitates the unified management features of the invention and enables placing of group components (such as device enclosures) in one or more cabinet. The key features of reporting groups is explained fully with reference to FIG. 6. Briefly, however, system 200 includes two reporting groups, which are managed by the management device 202. One reporting group includes the enclosures 100 on shelves 222, 224, and 226 and array controllers 240 on shelf 228 and the second reporting group includes the enclosures 100 on shelves 230, 232, 234 and the array controllers 242 on shelf 236. The Fibre Channel loops 216 connecting each of shelves in each reporting group are separate. At the level of the Fibre Channel or communication loop 216, there is no interaction between the enclosures 100 and controllers 240, 242 of the two reporting groups. The controllers 240, 242 are responsible for assignment of the unique reporting group number or identifier to each of the enclosures 100 and in some embodiments, to the EMU 130 in each enclosure 100.

Shelves 222, 224, 226, 228, 230, 232, 234, 236 in the cabinet 220 (and any other cabinet included in the system 200) are communicatively linked out-of-band of the data link 244. This may be provided within the cabinet 220 in a variety of ways. For example as illustrated, a cabinet cable 244 is linked to each of the shelves 222, 224, 226, 228, 230, 232, 234, 236 to allow messages to be communicated substantially simultaneously to each of the enclosures 100 and array controllers 240, 242 within a cabinet 220. Concurrent messaging is provided throughout the system 200 by inclusion of cabinet processors 246 linked to the cabinet cable 246 and a cabinet communication network 250, which is a data network, such as an Ethernet, linking all cabinets 220 in the system 200 to each other. As shown, all of the shelves 222, 224, 226, 228, 230, 232, 234, 236 share the cabinet cable 244 and the cabinet processor 246. In one embodiment, the cabinet cable 244 is configured similar to the cable shown in FIGS. 1 and 3 although other bus or link designs may be used to practice the invention and the cabinet processor 246 is configured as an EMU. The cabinet processor 246 further communicates with and operates a cabinet LED (and/or audio device) via link 248 (e.g., an I²C bus).

With this general understanding of the components of the system 200 understood, a discussion of data flow and collection paths, such as environmental reporting, in the system 200 is provided to highlight how unified management is provided in the system 200. Each enclosure 100 continually operates, typically via an included EMU 130, to collect environmental information for the components within the enclosure 100 (or on the shelf 222, 224, 226, 228, 230, 232, 234, 236). The collected information is then broadcast from the enclosures 100 over the cabinet cable or bus 244 to all members of the same reporting group. Each enclosure 100 (via its EMU 130) may determine if the broadcast message is for its reporting group and may filter out SES and/or other data originating from enclosures 100 or devices in different reporting groups. Environmental or SES data broadcast in messages from each reporting group within a cabinet 220 shares the cabinet cable 244 bandwidth with the other reporting groups within the cabinet 220. Some of this data or these messages may originate from a different cabinet 220.

According to another aspect of the invention, any enclosure 100 and enclosure EMU or processor 130 in each reporting group can be accessed directly by the management device 202 via the host computers 210, 212 and array controllers 240, 242 via the Fibre Channel paths 216. Preferably, within each reporting group, one enclosure 100 or enclosure EMU 130 is assigned to be a primary reporting device (e.g., primary enclosure EMU 130) with the other enclosures 100 or enclosure EMUs 130 being secondary reporting devices. The assignment or selection of the primary reporting device may be performed by the host computers 210, 212 or array controllers 240, 242 within each reporting group and this selection can be arbitrary. In other words, any of the enclosures may be selected to be the primary reporting device and the designation can be changed during operation of the system 200 to support reconfiguration of the system 200 and/or maintenance.

The primary reporting device is responsible for responding to requests from the management device 202 and/or the host computers 210, 212 (via the user interface software) for environmental and/or other data pertaining to the entire reporting group or a portion of the group. The response from the primary reporting device may include data for all components and devices (e.g., for sub-enclosures) on the shelves 222, 224, 226, 228, 230, 232, 234, 236 of the reporting group for which the primary reporting device is assigned and may be formatted to satisfy various reporting and messaging protocols. The data includes reporting group messages broadcast from each enclosure 100 in the reporting group within or outside the cabinet 220 and over the shared cabinet cable 244. In addition to collecting system data from a single device 202, management or control is achieved from a single management device 202 by issuing control commands to the host computers 210, 212 for a report group(s) which communicates the control commands to the primary reporting device (or primary EMU 130). The primary reporting device, in turn, processes the control command and forwards the processed control command to the target enclosure 100 or enclosure EMU 130 over the Fibre Channel loop 216.

The cabinet processor 246, such as an EMU, functions as a router of broadcast messages and data including environment information (e.g., SES information) and as a firewall for the devices within cabinet 220 linked to the cabinet cable 244. When the enclosures 100 broadcast or transmit messages on the cabinet cable 244, the cabinet processor or EMU 246 determines whether the messages (such as SES data) should be forwarded to other cabinets (not shown) attached to the cabinet communication network 250. In one embodiment, the cabinet processor 246 passes along all messages because reporting groups may scan two or more cabinets in the system 200. In another embodiment, the cabinet processor 246 performs a lookup or comparison of the reporting groups within the cabinet 220 to determine if any of the reporting groups span to other cabinets. If yes, the message or a portion of the message on the cabinet cable 244 is broadcast over the cabinet communication network to all cabinets or to the cabinets containing components or shelves within the reporting group. Otherwise, the message is not broadcast outside the cabinet.

In many embodiments, messages are broadcast over the cabinet communication network 250 to all cabinets and the cabinet processor 246 may function as a filter or firewall. In these embodiments, the cabinet processor or EMU 246 receives a broadcast or forwarded information, such as SES data. The cabinet processor 246 filters the received message and any information pertaining to reporting groups within the cabinet 220 is rebroadcast or forwarded to the cabinet bus or cable 244. The processors or EMUs 130 of each of the enclosures 100 on the shelves 222, 224, 226, 228, 230, 232, 234, 236 receive the rebroadcast information, determine if the information pertains to its reporting group (filtering out other reporting group information) and if applicable to its reporting group, store the information (such as in memory 138, 140, 142 and the like). Note, the rebroadcast information appears as if it were transmitted within the cabinet 220 to the enclosure EMU 130. To provide fuller system information to the management device 202, the cabinet EMU 246 preferably creates and broadcasts messages such as SES data for itself as a sub-enclosure or device to the cabinet cable 244. Each enclosure, regardless of reporting group, within the cabinet 220 of the cabinet EMU 246 receives and stores the information and includes it as sub-enclosure information in reports provided by each primary reporting device.

As can be seen from the above description, the inclusion of the cabinet cable 244, its configuration, and the technique of linking it to each enclosure EMU 130 and array controller 240, 242 provides two important functions for the management system. First, the cabinet cable 244 may be configured to provide shelf identifiers as discussed with reference to FIGS. 1–3. Second, the cabinet cable 244 provides a communication path between the enclosure EMUs or processors 130 that is separate from and does not conflict or compete for bandwidth with the data path 216 to the enclosure drives 116. For example, the controller area network (CAN) bus portion of the cabinet cable 244 may be used for these behind the disk device communications. The use of the cable 244 provides an "out-of-band" communication path that facilitates ongoing broadcasting of environmental and other information in messages throughout the system 200 and significantly, among all members of reporting groups whether the members or devices are in one or more cabinets 220 in the system 200. For the management system, the specific configuration of the cabinet cable 244 is not as important as its inclusion and its connection to each of the shelves within each cabinet 220 in the system 220.

The system 200 illustrated in FIG. 5 was useful for explaining data flow and connections within a cabinet 220. Referring now to FIG. 6, a multi-cabinet mass storage system 300 is provided to more fully explain the reporting group concept of the invention. As shown, five GUI hosts 302, 304, 306, 308, 310 are provided to communicate with a centralized management device (not shown but similar to the device 202 of FIG. 5) and to provide an access point to reporting groups and typically to controllers in each reporting group. The mass storage system 300 includes five cabinets or rack devices 314, 316, 318, 320, and 322 each having a plurality of shelves 324 for holding and linking computing devices such as controllers (e.g., array controller pairs), device enclosures, and the like. The cabinets 314, 316, 318, 320, and 322 are each shown to have 14 shelves but the invention is useful in systems 300 having greater or fewer cabinets, with cabinets having greater or fewer shelves, and with systems 300 mixing cabinets with differing numbers of shelves and components on such shelves.

Cabinet processors, such as EMUs, 328 are provided in cabinets 314, 316, 318, and 320 to function as filtering devices and reporting group message routers (as described for processor 246 of FIG. 5). The cabinet processors 328 are linked to the cabinet network 330, such as an I²C bus, an Ethernet, a LAN, a WAN, or other network or communication bus, to provide a data flow path among reporting groups in different cabinets. A data path is provided between the GUI hosts 302, 304, 306, 308, 310 (such as computing devices running user interface and system monitoring software applications) and devices in the cabinets 314, 316, 318, 320, 322 by data links 360 (e.g., Fibre Channel loops).

As discussed previously, the unified management features of the present invention are useful for providing single access points to data storage complexes, such as complex 300, and for facilitating sharing components, such as device enclosures and controllers, located in one or more cabinet 314, 316, 318, 320, 322. To explain these features, the mass storage complex 300 is shown to have six reporting groups 334, 338, 342, 346, 350, 354 that are each configured differently to illustrated the flexibility provided with the use of reporting group arrangements and complex-wide message broadcasting or environmental/data reporting.

The first reporting group 1 is shown to include controllers on a shelf 324 of one cabinet 314 and device enclosures or data storage devices on shelves 324 of two other cabinets 316 and 318. The GUI host 302 is linked to the controllers in cabinet 314 and the controllers and device enclosure are linked by data paths 360. For the controller in cabinet 314 to be able to report environmental data for all of the storage devices in the first reporting group 334 to the GUI host 302, the controllers need to communicate with five storage devices in two different cabinets from the cabinet 314 in which it resides. This is achieved by the controller assigning one of the enclosures as the primary reporting device. For example, the enclosure processor or EMU of the enclosure on the twelfth shelf of cabinet 316 may be informed that it is the primary reporting device and is responsible for collecting environmental and/or other information from the other storage devices in the reporting group 334. As discussed, any enclosure or storage device may be designated as primary reporting device, which allows devices to be replaced and assigned to different reporting groups.

As shown in FIGS. 2 and 5, the processors or enclosure EMUs 130 of the enclosures 100 are not directly connected to the data path 360, e.g., fibre channel loops, which prevents the enclosure EMUs 130 from determining which array or data loop 260 they are connected to. The assignment of the enclosures to the reporting group 334, may proceed by assigning each of the five data storage devices in cabinets 316 and 318 an identical reporting group number or identifier (ID). Using the reporting group ID as an address, the two storage devices in cabinet 318 in reporting group 334 broadcast their environmental data or other information in a reporting message. The message is sent via a cabinet bus (such as cable 244 of FIG. 5) to the cabinet EMU 328 which transmits the message over the cabinet network 330 (which connects all cabinets 314, 316, 318, 320, 322 in the mass storage complex 300) to the cabinet EMU 328 in cabinet 316 (and in many embodiments, to all cabinets connected to the network 330).

This cabinet EMU 328 may determine if the message is for a reporting group within the cabinet 316 and, if so, rebroadcast the message on the cabinet cable 244 of cabinet 316. The devices in reporting group 338 may ignore the message because it does not pertain to their reporting group ID. The secondary devices in reporting group 334 in cabinets 316, 318 accept and store the information while the primary device on the twelfth shelf 324 of cabinet 316 accepts and stores the message. In a preferred embodiment, the primary reporting device via its EMU 130 may process the message to place the included environmental data into a message form dictated by reporting specifications and/or protocols (such as SES pages required by SES specifications) and transfers these pages to the controller in cabinet 314 via the data path 360. These pages may be transferred on an ongoing basis as data is received from devices in the reporting group, on a predetermined periodic basis, and in response to requests from the controller or GUI host 302.

The mass storage complex 300 further includes a second reporting group 338 which is similar to the first reporting group 334 except that it only spans between cabinets 314 and 316. The second reporting group 338 is in communication with GUI host 304 via data path 360 attached to controllers in the ninth shelf of cabinet 314. Cabinet 314 includes two device enclosures on the seventh and eighth shelves 324 and cabinet 316 includes three device enclosures on the seventh, eighth, and ninth shelves 324 of cabinet 316. Any of the enclosure devices may be assigned to be the primary reporting device and the controller would receive consolidate pages containing environmental data from that primary reporting device, which gathers the information from messages broadcast on the cabinet cables of cabinets 314, 316 and the cabinet network 330. The third reporting group 342 of the complex 300 includes similar components as the second reporting group 338 but these components are located cabinets 318, 320 and may be accessed and monitored via GUI host 310.

Although the management system and out-of-band communication path features of the invention are particularly useful in sharing devices among cabinets, the fourth reporting group 346 illustrates that all the devices of a particular group may be located within a single cabinet (such as cabinet 320). Within reporting group 346 a primary reporting device would still be designated by the controllers in the tenth shelf 324, messages would still be broadcast by the enclosure devices onto a cabinet cable (such as cable 244 shown in FIG. 5) and the cabinet EMU 328 of cabinet 320 would (in most embodiments) broadcast the messages onto the cabinet network 330. The cabinet EMUs 328 in the other cabinets 314, 316, and 318 would filter or block the messages though as not being applicable to reporting groups residing within their cabinets.

GUI host 310 is linked to the fourth reporting group 346 as well as reporting group 342. This illustrates that a single host device may be attached to more than one communication loop or data path 360 to enable a single device to manage more than one reporting group. Single device management may further be achieved by two or more of the GUI hosts 302, 304, 306, 308, 310 to a management tool (such as management device 202 of FIG. 5). Even with the use of a single host or management device, each reporting group 342, 346 requires assignment and retention of a primary reporting device to collect environmental information and to allow reporting group specific control commands to be directed to each reporting group (as these commands are processed and routed by the primary reporting device).

The fifth reporting group 350 of the complex 300 is illustrated to be positioned within a cabinet 322 that does not have a cabinet EMU 328 or a connection to the cabinet network 330. Without these components, the fifth reporting group 350 cannot be expanded to the other cabinets 314, 316, 318, 320 to share other complex 300 components. However, a primary reporting device is still assigned and messages are broadcast on the cabinet bus of cabinet 322 for receipt and collection by the primary reporting device. The primary reporting device passes this information to the controllers in the fourteenth shelf 324 of cabinet 322 for transmission via loop 360 to GUI host 308.

The sixth reporting group 354 is provided to illustrate that controllers such as array controllers are not required to practice the management method of the present invention. The enclosures or storage devices in reporting group 354 are under the direct control of the GUI host 306 (which is often the case for non-RAID devices, such as JBOD (Just a Bunch of Disks) devices and shelves). A primary reporting device would be assigned by the GUI host 306 and messages would be broadcast by the devices in the reporting group 354 within the cabinet 314 (and not over the network 330 if the cabinet EMU 328 acts as a filter for outgoing messages by only transmitting messages outside cabinet 314 for reporting groups having member or devices outside cabinet 314).

With further reference to the enclosure 100 of FIG. 2 and the storage system 200 of FIG. 5, the environmental reporting and system-wide concurrent broadcasting features (and messaging protocols) of the invention are more fully described. As previously discussed, the cabinet cable or bus 244 and cabinet communication network 250 combine to allow effective, out-of-band transfer of environmental and other data between enclosure processors or EMUs 130. The data is preferably formatted to an industry expected and accepted standard, such as, but not limited to, the "SCSI-3 Enclosure Services Command Set (SES)" specification. Whichever data formatting standard is used, it is preferable that the system 200 be able to support all or most of the defined formats or pages. In one embodiment, all pages defined under SES are supported by the system 200. This embodiment specifically uses the following SES pages: Supported Diagnostics ("0"); Configuration ("1"); Status and Control ("2"); Help Text ("3"); String In and Out ("4"); Threshold In and Out ("5"); Enclosure Descriptor ("7"); and Short Status ("8"). Preferably, each device that is included within a reporting group supports these pages with support of the Configuration and Status and Control pages being a minimum requirement for inclusion in a reporting group.

At system 200 (or 300) start up, each enclosure EMU 130 and cabinet EMU 246 on the cabinet cable 244 sends a copy of a set of its data pages (such as all of its environmental pages except the Supported Diagnostics) onto the cable 244. In steady state operations, each enclosure EMU 130 and cabinet EMU 246 typically sends an update when a particular page significantly changes, with a "significant change" being defined by the sending device (e.g., such a change may include all changes in current, voltage, and temperature other above a set threshold) or in some embodiments, the pages are resent periodically whether or not a change has occurred.

All environmental data pages for each reporting group are gathered by the assigned or designated primary reporting device (e.g., by the EMU 130 of such enclosure 100). All commands (e.g., Control, String In and Out, and Threshold In and Out pages) are sent to the primary reporting device (e.g., to the EMU 130 of the enclosure 100 acting as the primary device) by a host 210, 210 directly or via a controller 240, 242. The primary EMU 130 then parses the command data and forwards the appropriate portion to the secondary devices within the same reporting group (to the EMUs 130 of these enclosures 100) over the cabinet cable 244 and, if necessary, over the cabinet communication network 250.

Depending on data formatting specification being implemented within the system 200, the EMU 130 of the primary reporting device or enclosure 100 preferably performs some processing of the commands prior to transmitting the command pages or messages over the cabinet cable 244. For example, in an SES embodiment, the primary EMU 130 may be configured to process a Control page by breaking or dividing it into smaller Control pages or sub-pages. Such as division may be performed based on the sub-enclosure identification of each element in the combined Configuration page. Each sub-page is then sent only to the appropriate or indicated secondary devices via the cabinet cable 244 and/or cabinet communication network 250. The EMUs 130 of the secondary devices or enclosures 100 in turn perform a screening process to determine if the page identifies the proper reporting group and sub-enclosure (device) and in some cases, to complete a consistency check of the particular command to verify the command is an appropriate command for the devices within the enclosure 100.

The messages broadcast from each device in a reporting group and other sub-enclosures linked to cabinet cables 244 (such as cabinet EMUs 88, 246) may take a number of forms and include a variety of information. Preferably, each broadcast message includes at least the sending (or receiving for forwarding and control command messages) device's reporting group ID to allow a primary device to determine whether or not to collect the information and in many preferred embodiments the cabinet ID, and shelf identifier and/or location.

FIG. 7 illustrates one exemplary message 400 that may be broadcast by an EMU 130 of an enclosure 100, by a cabinet EMU 88, 246, or other device according to the management system of the invention. As shown, the message includes a header 402 and a payload 406 (e.g., a message content portion). The size in bits provided for each portion of the header 402 will typically vary depending on the CAN bus controller 156 or interface chip utilized in the enclosure processor 130 and cabinet processor 88, 246. For example, the illustrated extended message header provides 29 bits of header information and up to 8 bytes of data payload 406 per packet or message 400 (as is provided by the Philips SJA1000 Standalone CAN Controller). This has proven to be a useful message 400 arrangement but many other embodiments will be apparent to those skilled in the arts and are considered to be within the breadth of this disclosure and the following claims.

As illustrated, the header 402 includes the sender's reporting group ID or number 410 that allows a primary and secondary reporting devices to quickly determine if the message 400 on the cabinet cable 244 should be collected, processed, and stored or simply ignored (by a comparison with a reporting group ID in enclosure processor 130 memory). The reporting group ID (and grouping enclosures and devices in reporting groups) allows unitized storage system management and reduces the memory requirements for the enclosure EMUs 130 and CAN bus controllers 156. The illustrated message 400 shows the use of 12 of the header bits for the reporting group ID 410. These can be bits 1 to 7 of byte 1 and bits 0 to 4 of byte 0 (or other bytes). The CAN bus controller 156 acts as the filter for the EMU 130 by setting one of its acceptance filters to trigger on any message 400 that includes a value in the reporting group ID 410 portion of the message 400 that matches the receiving enclosure or node reporting group ID. If a match occurs, at least SES information in the payload 406 is accepted and stored by each enclosure EMU 130 (to allow any device to be the primary reporting device). Typically, a predetermined number or ID, such as "0", is reserved for the cabinet EMUs 88, 246 (which can be thought of as virtual members to all reporting groups within the same cabinet).

The message header 402 also includes the sender's cabinet identifier, e.g., number ID, 414. In the illustrated embodiment or messaging protocol the cabinet ID is 8 bits (bits 1 to 7 of byte 2 and bit 0 of byte 1). In one preferred embodiment, each cabinet EMU 88, 246 is configured with a unique 8 bit cabinet ID number and the ID number is available to all devices on the shelves of the cabinet linked to the cabinet cable 244. Each device or enclosure 100 stores this cabinet ID in memory and then uses this value in all messages 400 it sends. When no cabinet EMU 88, 246 is provided a zero value is used in messages 400.

The message header 402 further includes the sender's shelf identifier or location 418 which provides it position within the cabinet indicated by the cabinet ID 414. As illustrated, the shelf ID 418 is 4 bits (bits 3 to 6 of byte 3). In the positioning scheme presented in this disclosure, the shelf ID is a number (typically ranging from 1 to 14 or 1 to 24 or higher) that represents a number of distance increments, such as 3U, from the bottom of the cabinet. A shelf ID of zero is used if the position is not known or determined at the time the message 400 is to be sent. As can be appreciated, the inclusion of the cabinet number 414 and the shelf ID 418 provides a specific location of the reporting device within the storage complex 200, 300.

In addition to these components of the header 402, a format switch bit (FSW) 422 may be provided in the header 402 to indicate the format of the following message payload 406. For example, the bit may be set (at 1) when the payload 406 includes environmental information such as SES data used by primary EMUs 130 to provide sub-enclosure reporting to the controller 240, 242 or host 210, 212. Otherwise, the message payload 406 is a background message that is not always needed in reporting. A send diagnostic bit (SD) 426 may be provided to allow a primary EMU 130 to send SES Send Diagnostic pages to single enclosures 100 within a reporting group. Receive Diagnostic pages are typically sent to all enclosures 100 within a reporting group, but the send diagnostic bit 426 is set when the SES data in the payload 406 is part of a send diagnostic page. Additionally, reserved bits 430 are preferably provided to allow expansion of the unified management system.

The message payload 406 may also take a variety of forms and the form shown is provided for illustration only not as a limitation. The payload 406 shown includes a message code section 434 that indicates the form and type of following data in the data section 438. This facilitates correct and more efficient message 400 processing by the enclosure EMU 130.

As discussed above, device failures may cause the Fibre Channel loop to fail. In some instances in which a device fails, the controllers may close the device's bypass circuit 112 to remove the device from the Fibre Channel loop. However, if a device crashes suddenly, there may not be enough time for the controllers to close the device's bypass circuit. In this event, the device failure will disable the entire Fibre Channel loop. Accordingly, the Fibre Channel loop cannot be used as a communication path to locate the failed device.

Figure 8:
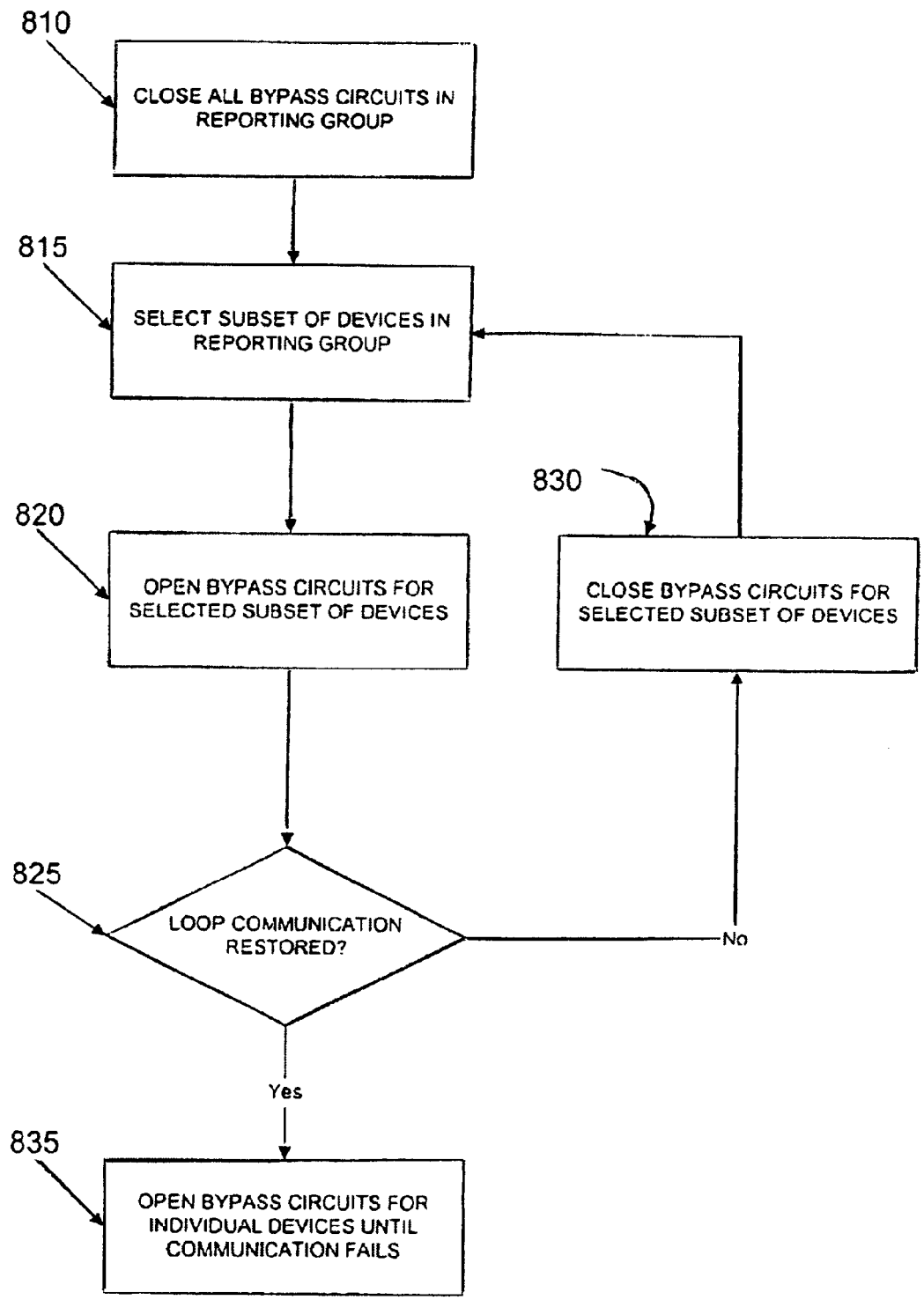
FIG. 8 is a flowchart illustrating steps of a first method for locating a failed storage device in a data storage system in accordance with one embodiment of the present invention.
Figure 9:
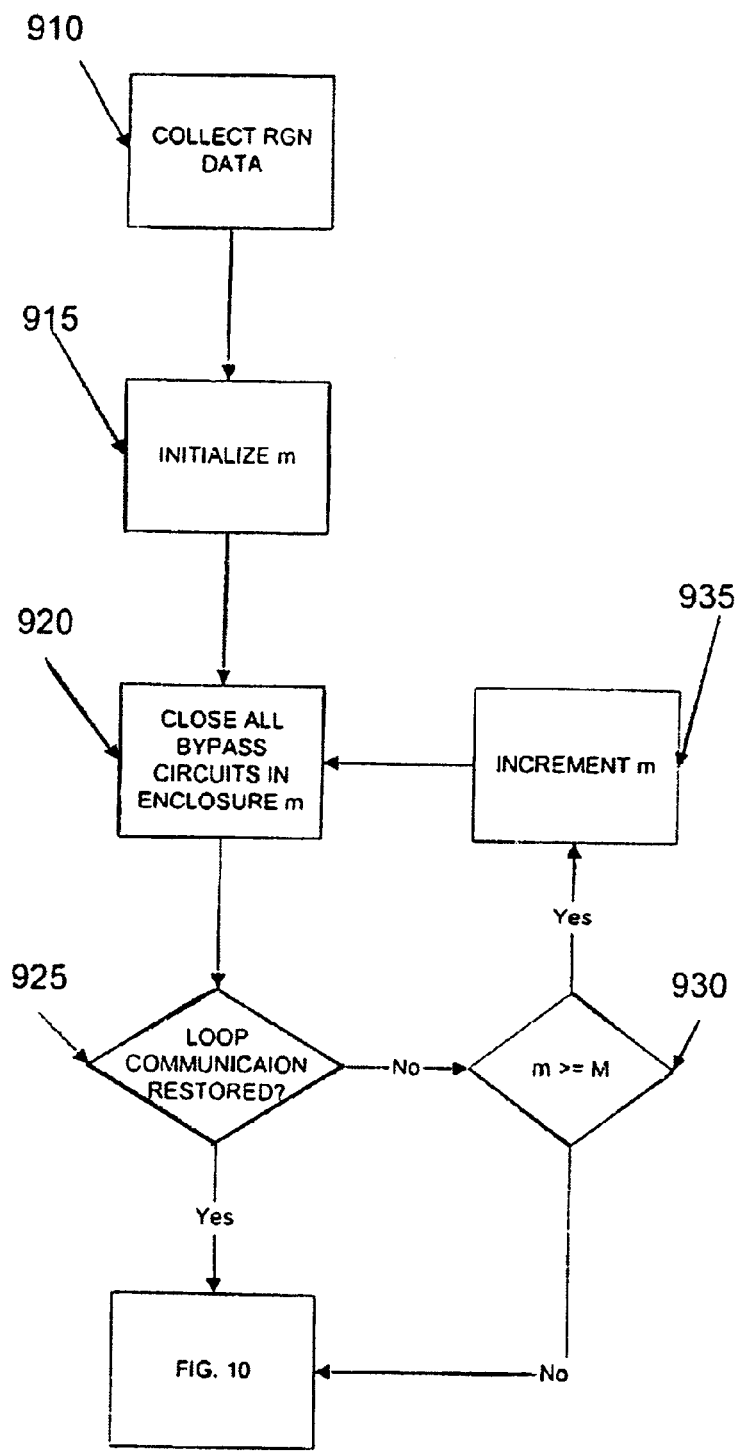
FIGS. 9–10 are flowcharts illustrating steps of a second method for locating a failed storage device in a data storage system in accordance with one embodiment of the present invention.
Figure 10:
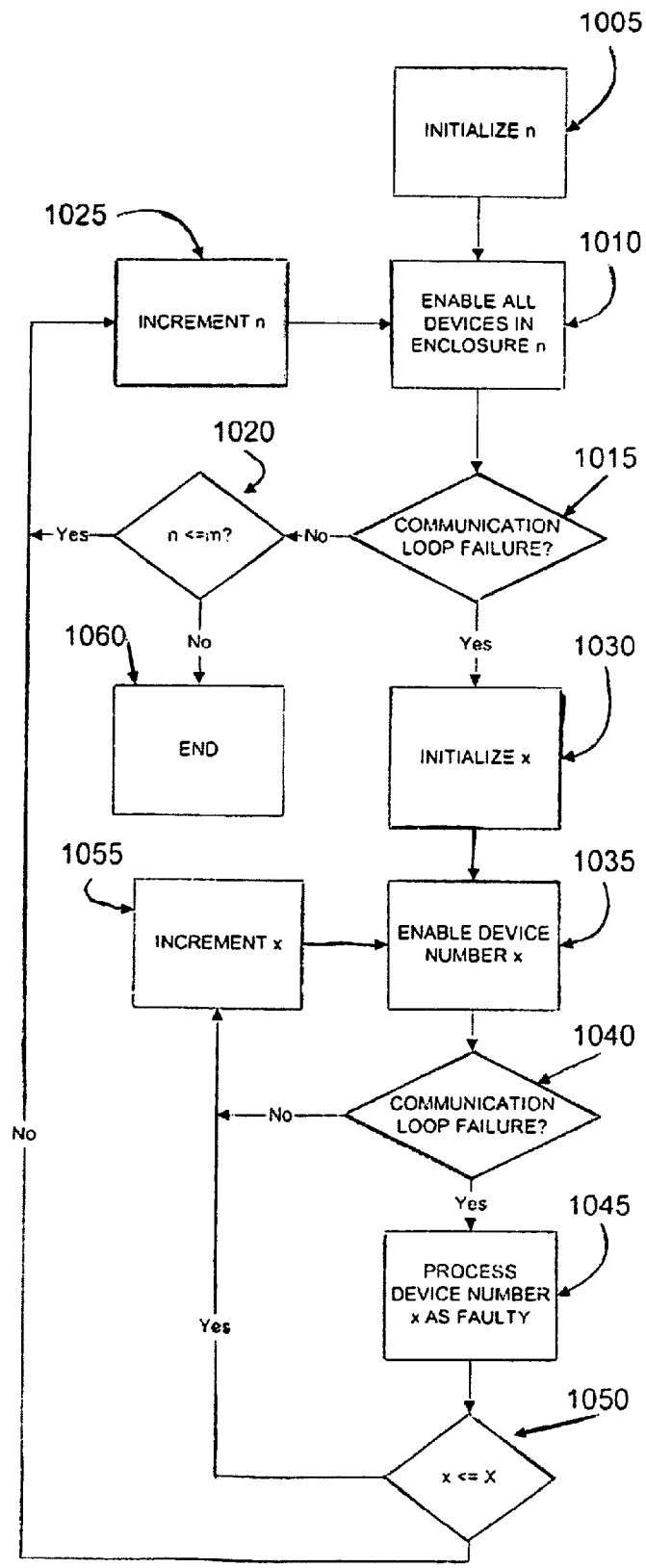

FIGS. 8–10 are flowcharts illustrating methods of locating a failed device on a Fibre Channel loop. As used herein, the term device refers to any device that includes a communication port on the Fibre Channel loop. Examples of devices include disk drives and GigaBit Interface Converters (GBICs), which function as a master communication port for the enclosure. In the following description, it will be understood that each block of the flowchart illustrations, and combinations of blocks in the flowchart illustrations, can be implemented by computer program instructions. These computer program instructions may be loaded onto a computer or other programmable apparatus to produce a machine, such that the instructions that execute on the computer or other programmable apparatus create means for implementing the functions specified in the flowchart block or blocks. These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block or blocks. The computer program instructions may also be loaded onto a computer or other programmable apparatus to cause a series of operational steps to be performed in the computer or on other programmable apparatus to produce a computer implemented process such that the instructions which execute on the computer or other programmable apparatus provide steps for implementing the functions specified in the flowchart block or blocks.

Accordingly, blocks of the flowchart illustrations support combinations of means for performing the specified functions and combinations of steps for performing the specified functions. It will also be understood that each block of the flowchart illustrations, and combinations of blocks in the flowchart illustrations, can be implemented by special purpose hardware-based computer systems which perform the specified functions or steps, or combinations of special purpose hardware and computer instructions.

Referring to FIG. 8, the method begins at step 810 when communication fails on a ring-type network. At step 810 the bypass circuits for every device in the Fibre Channel loop are closed, so that all devices are removed from the loop. Optionally, the controllers may then transmit a message across the loop to determine whether one or both of the controllers have failed, or that the Fibre Channel loop has failed for another reason. Next, at step 815, a predetermined subset of the devices is selected, and the bypass circuits for this predetermined subset of the controllers are opened (step 820), which brings the predetermined subset of devices back into the Fibre Channel loop. At step 825, the Fibre Channel loop is tested to determine if communication on the loop is restored. If the Fibre Channel loop remains in a failure mode, then it can be concluded that one of the devices in the selected subset is faulty. Accordingly, at step 830, the bypass circuits in the selected subsets are closed to remove these devices from the Fibre Channel loop. Control is then returned to step 815, whereupon a different subset of devices is selected and the bypass circuits for this subset of devices are opened (step 820). This iterative process can be repeated until communication is restored on the Fibre Channel loop. Once the Fibre Channel loop is functioning, bypass circuits can be opened individually (step 835). When the failed device is added back into the Fibre Channel loop, it will cause the Fibre Channel loop to fail, thereby exposing the failed drive.

In a dual Fibre Channel loop network architecture, each device will have two communication ports: one for the "A" loop and one for the "B" loop. When implementing this method in a dual Fibre Channel loop, both bypass circuits on each device may be closed, such that all devices are removed from both loops. Similarly, when devices are brought back into the loop both bypass circuits are opened, such that the selected subset of devices are added back into both the "A" loop and the "B" loop. Alternatively, the devices may be removed sequentially from the "A" loop and then the "B" loop.

In an exemplary embodiment, a first predetermined subset of devices may correspond to one of: 1) devices that reside in even slots, or 2) devices that reside in an odd slots. Dividing the devices into two groups eliminates the need to test individually approximately 50% of the devices in the group. It will be appreciated, however, that the devices may be grouped into subsets of relatively more or fewer devices. Decreasing the size of the first subset correspondingly decreases the likelihood that the failed device is in this subset, which increases the likelihood that the Fibre Channel loop will function when the bypass circuits of these devices are opened. However, decreasing the size of the first subset increases the amount of post-recovery testing that must be performed to locate the failed drive. By way of example, at one extreme all the bypass circuits may be closed and a single device may be selected. The probability that the selected device is the faulty device is quite low, so the probability that the Fibre Channel loop will function is quite high. However, this technique requires significant post-recovery testing to locate the failed drive.

In an exemplary embodiment, computer program instructions for implementing the method described with reference to FIG. 8 may reside in a memory associated with a controller responsible for a reporting group. For example, referring to FIG. 5, computer program instructions may reside in memory associated with controllers 242 and may be executed on a processor associate with controllers 242. The signals for opening and/or closing the bypass circuits may be transmitted to the I/O module on the enclosures via the cabinet bus 244. If the reporting group includes enclosures residing in different cabinets, the signals for opening and/or closing the bypass circuits may be transmitted to a different cabinet via the cabinet processor 246 and the cabinet communication network 250. Alternatively, the computer program instructions for implementing the method may reside in a memory associated with a host computer, e.g., host computer 210 or 212. However, the host computer must then be provided access to the cabinet bus 246 to communicate signals for opening and/or closing the bypass circuits to the I/O module.

FIG. 9 and FIG. 10 are flowcharts illustrating an alternate method of locating a failed device and restoring communication in a storage system in accordance with the present invention. In contrast to the method set forth in FIG. 9 and FIG. 10 tests devices in the reporting group on an enclosure-by-enclosure basis. In brief, the logic instructions set forth in FIG. 9 execute a routine that sequentially deactivates enclosures and tests communication over the Fibre Channel loop to determine whether the "remaining" enclosures (i.e., those not yet deactivated) do not include a faulty device(s). When either (a) communication on the Fibre Channel loop is restored; or (b) all enclosures have been tested and communication was not restored, control is passed to FIG. 10. The logic instructions in FIG. 10 execute a routine that sequentially activates individual devices in enclosures to determine which device(s) may be faulty.

Referring to FIG. 9, at step 910 the location of the devices that are participants in a reporting group on a malfunctioning Fibre Channel loop is identified. In an exemplary embodiment, the location of the devices that are participants on the loop is identified by the cabinet number and the enclosure number. This may be accomplished by having a controller (e.g., controller 42a, 42b in FIG. 1b or a controller in a host computer) issue a page to the participants in the controller group. The Fibre Channel loop will not be functioning when this page is issued, so the command may be transmitted across the cabinet bus. The device locations may be stored in a suitable memory.

Once the device locations are obtained, the logic instructions set forth in FIG. 9 execute a routine that sequentially deactivates enclosures and tests communication over the Fibre Channel loop to determine whether the "remaining" enclosures (e.g., those not yet deactivated) do not include a faulty device(s). Assuming a reporting group includes M enclosures, at step 915 a counter m is initialized (e.g., set equal to 1). At step 920 all bypass circuits assigned to the failed reporting group are closed, removing all devices in the enclosure from the Fibre Channel loop. At step 925 the Fibre Channel loop is tested to determine whether closing the bypass circuits of the devices in the selected enclosure restored communication. If communication over the Fibre Channel loop is restored, then it is known that the remaining enclosures do not contain a faulty device, and control is passed to a logic routine for locating the failed device(s) and restoring communication on the loop (FIG. 10). If communication is not restored, then at step 930 a test is executed to determine whether all M enclosures have been tested. If not, then m is incremented (step 935) and the bypass circuits of the devices on the "next" enclosure in the reporting group are closed. If all M enclosures are tested and communication is not restored, then control is passed to the logic instructions illustrated in FIG. 10.

FIG. 10 presents logic instructions for testing a specific enclosure to locate a failed device, and optionally to remove the device from the Fibre Channel loop to restore communication on the loop. In the logic instructions of FIG. 10, the reporting group is assumed to have N enclosures, each of which may house up to X devices. Referring to FIG. 10, at step 1005 a counter n is initialized. At step 1010, the communication ports of all devices in enclosure number n are enabled, so that all devices in enclosure number n are added back onto the Fibre Channel loop. Communication over the Fibre Channel loop is then tested (step 1015). If adding enclosure number n back into the Fibre Channel loop did not cause communication over the Fibre Channel loop to fail, then enclosure number n does not includes a faulty device. At step 1020, if n is less than or equal to m, then n is incremented and the devices in the "next" enclosure are added back into the Fibre Channel loop. If n is not less than or equal to m, then all m shelves have been tested and found not to be faulty. This is inconsistent with the conditions that caused the logic of FIG. 10 to be executed, so an error routine is invoked. The error routine may simply log the error in a suitable memory.

If, at step 1015, adding enclosure number n back into the Fibre Channel loop causes communication over the Fibre Channel loop to fail, then it is assumed that enclosure number n includes at least one faulty device. In response to this condition, the logic instructions execute a routine that sequentially activates individual devices in enclosure number n and tests communication over the Fibre Channel loop to determine whether the device is faulty. Assuming enclosure n includes X devices, at step 1030 a counter x is initialized (e.g., set to 1). At step 1035, the communication port(s) of device number x are enabled, adding device number x back onto the Fibre Channel loop. At step 1040 communication on the Fibre Channel loop is tested. If adding device number x of enclosure number n did not cause a communication failure, then x is incremented (step 1055) and the "next" device in enclosure number n is enabled.

By contrast, if enabling the communication ports of device number x of enclosure n caused a communication failure on the Fibre Channel loop, then this device is processed as a faulty device at step 1045. Processing as a faulty device may include storing information identifying the device in a suitable memory and, optionally, may also include disabling the communication ports of the faulty device to remove the device from the Fibre Channel loop. If enclosure number n includes additional devices to test (step 1050), then x is incremented at step 1055 and the "next" device in enclosure number n is tested. By contrast, all devices in enclosure number n have been tested (step 1050), then control passed to step 1025, which increments n so the "next" enclosure in the reporting group may be tested. The logic instructions of FIG. 10 terminate when n exceeds the value of m determined in the logic instructions of FIG. 9, i.e., when all enclosures identified in FIG. 9 as possibly being faulty have been tested.

Although the invention has been described and illustrated with a certain degree of particularity, it is understood that the present disclosure has been made only by way of example and that numerous changes in the combination and arrangement of parts can be resorted to by those skilled in the art without departing from the spirit and scope of the invention, as hereinafter claimed.

We claim:

1. In a storage system having a plurality of storage devices communicatively connected by a ring-type communication network, a method of locating a failed device, comprising:
   (a) disabling network access for all devices on the communication network by transmitting a disable signal on a communication bus separate from the communication network;
   (b) iteratively performing the following steps until communication on the ring-type network is restored:
      (1) enabling network access for a subset of devices on the communication network,
      (2) testing commurucatlon on the communication network, and
      (3) if communication on the communication network fails, then disabling network access for the subset of devices; and
   (c) if communication on the communication network is restored, then enabling network access for individual devices on the communication network until the addition of a device causes the communication network to fail.

2. The method of claim 1, wherein the step of disabling network access for all devices on the communication network comprises closing bypass circuits to disconnect the devices from the communication network.

3. The method of claim 1, wherein the step of enabling network access for a subset of devices in a communication network comprises transmitting an enable signal on a communication bus separate from the communication network.

4. The method of claim 1, wherein the step of enabling network access for a subset of devices in a communication network comprises opening bypass circuits to connect the devices to the communication network.

5. The method of claim 4, wherein on the first iteration the enable signal opens the bypass circuits on all devices assigned an even address.

6. The method of claim 4, wherein on the second iteration the enable signal opens the bypass circuits on all devices assigned an odd address.

7. The method of claim 1, wherein:
   the storage system comprises a plurality of disk drives contained within a cabinet;
   the cabinet includes a cabinet bus that provides an out-of-band communication path between one or more devices in the cabinet; and
   the disable signal is transmitted via the cabinet cable.

8. A system for locating a failed device in a computer-based information storage system, the storage system including a plurality of storage devices communicatively connected by a ring-type communication network comprising:
   at least one controller connected to the communication network and connected to an input/output module for regulating access to the communication network by the storage devices;
   a processor executing logic for generating a signal for disabling network access for all storage devices on the communication network and for transmitting the signal on a communication bus separate from the communication network;

a processor executing logic for iteratively performing the following steps until communication on the ring-type network is restored:
  (1) generating a signal for enabling network access for a subset of devices on the communication network,
  (2) transmitting the signal to the Input/output module on a communication bus separate from the communication network,
  (3) testing communication on the communication network; and
  (4) if communication on the ring-type network fails, then disabling network access for the subset of storage devices; and a processor executing logic for enabling network access for individual devices on the ring-type network until the addition of a storage device causes the ring-type network to fail.

9. The system of claim 8, wherein:

the devices are arranged in enclosures disposed on shelves of a networking storage cabinet; and a cabinet bus provides a communication link to the storage devices separate from the communication network.

10. The system of claim 8, wherein:

the communication network is a FCAL.

11. A computer program product in a computer readable medium for locating a failed device in a computer-based information storage system, comprising:

first instructions for disabling network access for all storage devices on the communication network by transmitting a disable signal on a communication bus separate from the communication network;

second instructions for iteratively performing the following steps until communication on the communication network is restored:
  enabling network access for a subset of devices on the communication network;
  testing communication on the communication network, and
  if communication on the communication network fails, then disabling network access for the subset of devices; and third instructions for enabling network access for individual devices on the communication network until the addition of a device causes the communication network to fail.

12. In a storage system comprising a plurality of devices residing in a plurality of enclosures and communicatively connected by a ring-type network, a method of locating a failed device comprising:

sequentially, on an enclosure-by-enclosure basis, disabling network access for all devices in enclosures on the ring-type network until communication on the ring-type network is restored;

sequentially, on an enclosure-by-enclosure basis, enabling network access for individual devices on the ring-type network by transmitting an enable signal on a communication bus separate from the communication network until the addition of a device causes communication on the network to fail.

13. The system of claim 12, wherein:

the storage system comprises a plurality of disk drives contained within a cabinet;

the cabinet includes a cabinet bus that provides an out-of-band communication path between one or more devices in the cabinet; and the disable signal is transmitted via the cabinet cable.

* * * * *

UNITED STATES PATENT AND TRADEMARK OFFICE
CERTIFICATE OF CORRECTION

| | |
|---|---|
| PATENT NO. | : 6,889,345 B2 |
| APPLICATION NO. | : 10/004374 |
| DATED | : May 3, 2005 |
| INVENTOR(S) | : Stephen J. Sicola et al. |

It is certified that error appears in the above-identified patent and that said Letters Patent is hereby corrected as shown below:

IN THE CLAIMS

Claim 1, Column 22, line 21, delete "commurucatlon" and insert therefor --communication--

Claim 8, Column 23, line 9, delete "Input/output" and insert therefor --input/output--

Signed and Sealed this

Twenty-third Day of June, 2009

JOHN DOLL
*Acting Director of the United States Patent and Trademark Office*